United States Patent
Widdershoven

(10) Patent No.: US 10,416,034 B2
(45) Date of Patent: Sep. 17, 2019

(54) METHOD AND SYSTEM FOR ANALYSIS OF PIXELATED CAPACITIVE SENSOR SIGNALS

(71) Applicant: NXP B.V., Eindhoven (NL)

(72) Inventor: Franciscus Petrus Widdershoven, Eindhoven (NL)

(73) Assignee: NXP B.V., Eindhoven (NL)

( * ) Notice: Subject to any disclaimer, the term of this patent is extended or adjusted under 35 U.S.C. 154(b) by 394 days.

(21) Appl. No.: 15/391,676

(22) Filed: Dec. 27, 2016

(65) Prior Publication Data

US 2018/0180653 A1    Jun. 28, 2018

(51) Int. Cl.
G01L 9/00    (2006.01)
G01L 19/12    (2006.01)

(52) U.S. Cl.
CPC ............ *G01L 9/0072* (2013.01); *G01L 19/12* (2013.01)

(58) Field of Classification Search
CPC . G01L 9/0072; G01N 27/227; G01R 27/2605
See application file for complete search history.

(56) References Cited

U.S. PATENT DOCUMENTS

| | | | |
|---|---|---|---|
| 9,524,041 B2 * | 12/2016 | Phulwani | G06F 3/044 |
| 2015/0130482 A1 | 5/2015 | van Lammeren et al. | |
| 2015/0164387 A1 * | 6/2015 | Varsavsky | A61B 5/0537 702/182 |
| 2015/0226736 A1 | 8/2015 | Nguyen et al. | |
| 2018/0088786 A1 * | 3/2018 | Abzarian | G06F 3/04845 |

FOREIGN PATENT DOCUMENTS

WO    2009047703 A1    4/2009

OTHER PUBLICATIONS

Stagni et al.; "CMOS DNA Sensor Array with Integrated A/D Conversion Based on Label-Free Capacitance Measurement"; IEEE Journal of Solid-State Circuits, vol. 41, No. 12; pp. 2956-2964; Dec. 2006.
Tsouti V. et al.; "Capacitive microsystems for bilogical sensing"; Biosensors and Bioelectronics 27; 11 pgs; 2011.
Valamontes, E. et al.; "Real time detection of volatile organic compounds through a chemocapacitor system"; S 2012—The 14th International Meeting on Chemical Sensors; 3 pgs.; 2012.
Lee, Chang-Hung; "A Low-Power Integrated Humidity CMOS Sensor by Printing-on-Chip-Technology"; Sensors 2014; pp. 9247-9255; 2014.

* cited by examiner

*Primary Examiner* — Elias Desta

(57) ABSTRACT

In an embodiment, a method for analyzing signals from a pixelated capacitive sensor is disclosed. The method involves classifying capacitance signals from sensor cells of a pixelated capacitive sensor into at least one class based on capacitance values for sensor cells indicated by corresponding capacitance signals and assigning an attribute to sensor cells based on the classification of the corresponding capacitance signals.

12 Claims, 10 Drawing Sheets

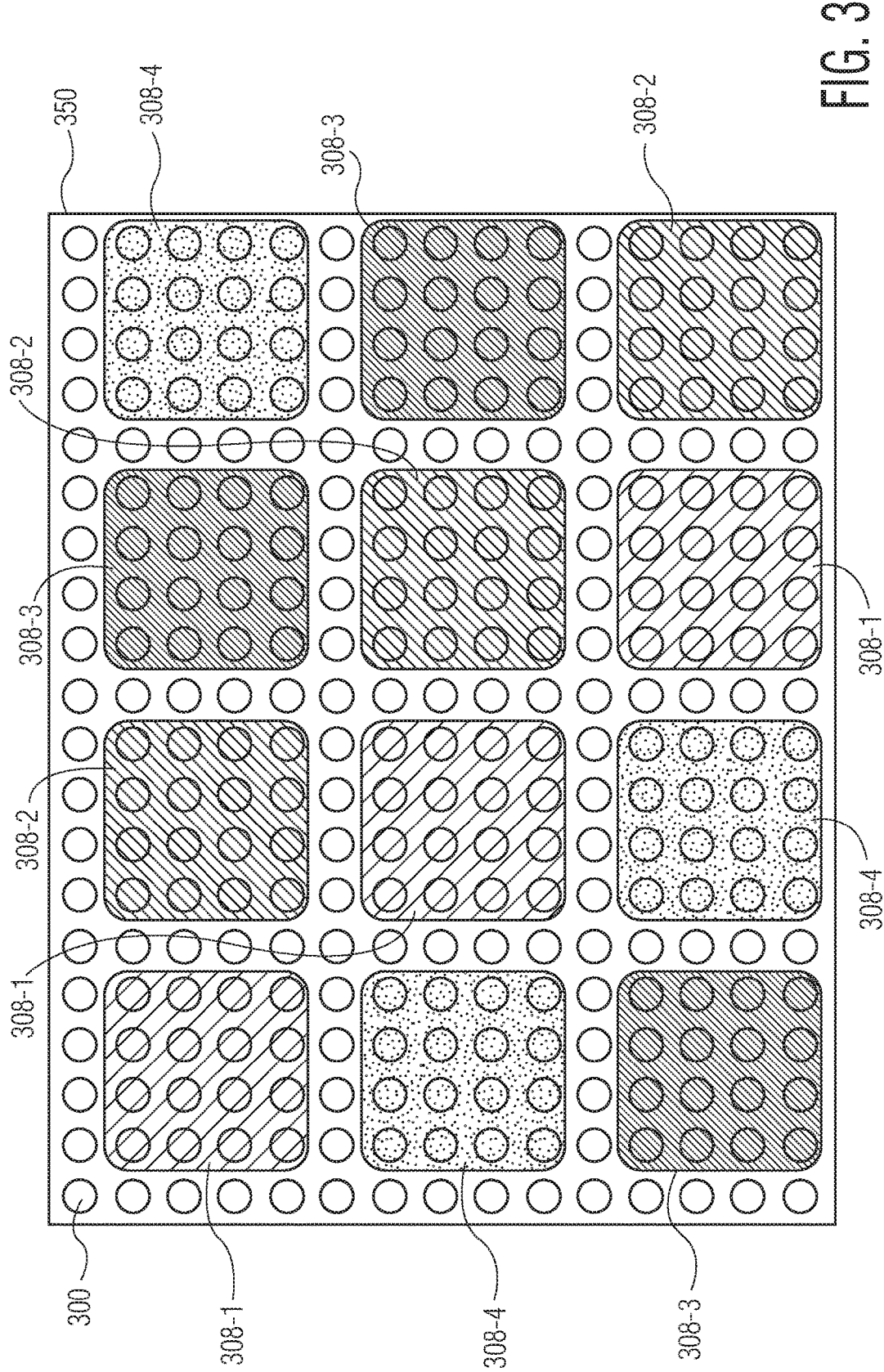

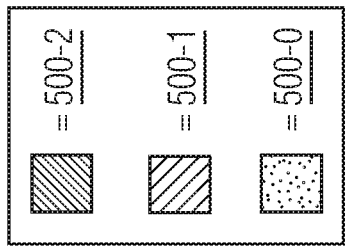
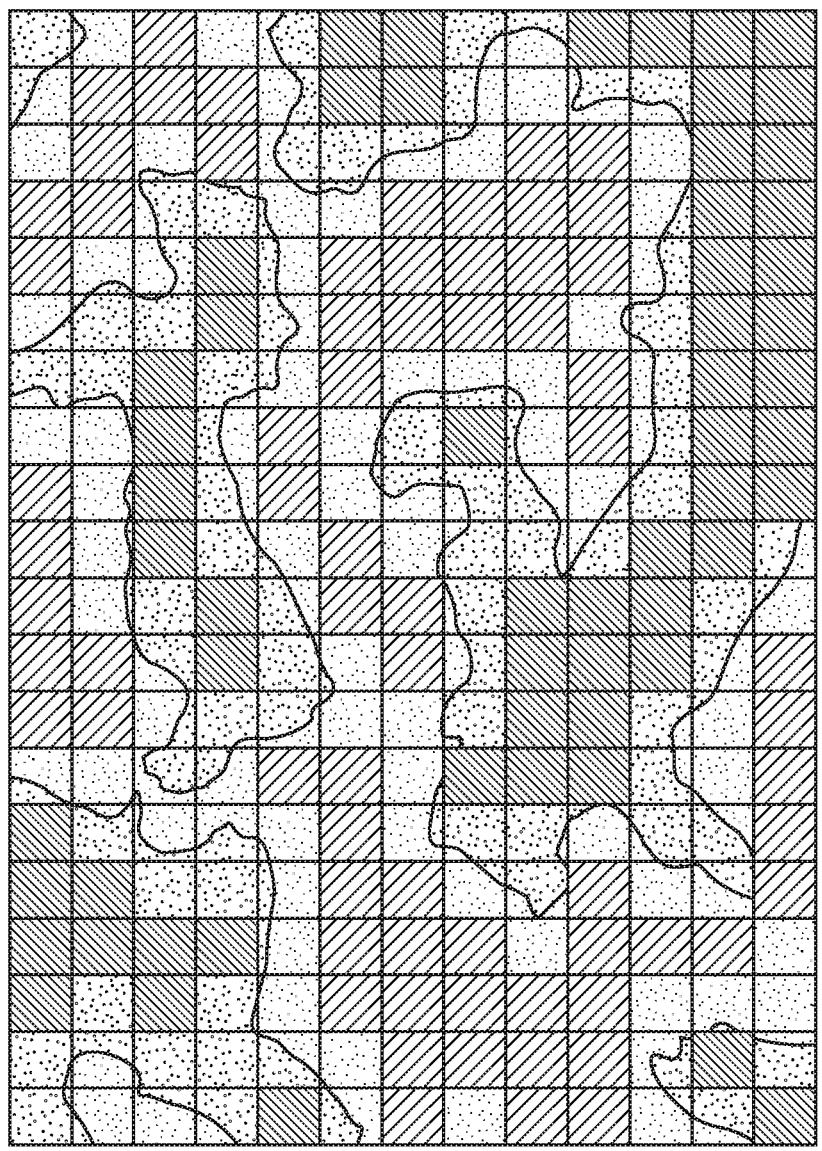
FIG. 5B

METHOD AND SYSTEM FOR ANALYSIS OF PIXELATED CAPACITIVE SENSOR SIGNALS

The invention relates to CMOS-based sensors, and, more particularly, to methods and systems for analysis of pixelated capacitive sensor signals.

CMOS-based sensors are key components for future smart applications such as smart homes or home diagnostics tests. Presently, CMOS-based sensors are used to measure "easy" variables, such as temperature and light intensity, with native CMOS elements like p-n junctions or sub-threshold MOS characteristics. As applications advance to sensing more challenging variables, new designs of CMOS-based sensors may need to be developed. Each new design may require backwards compatibility in order to measure "easy" variables, while measuring more challenging variables as well. The need for backwards compatibility can inhibit the development of a structured and scalable approach that is truly CMOS-compatible by design.

Pixelated capacitive sensor arrays offer a structured and scalable approach that is truly CMOS-compatible by design because the required components (e.g., sensor cells, calibration and reading electronics, analog-to-digital conversion, digital addressing, control and I/O circuitry, etc.) can all be made in standard CMOS processes with no or only minor modifications.

SUMMARY

In an embodiment, a method for analyzing signals from a pixelated capacitive sensor is disclosed. The method involves classifying capacitance signals from sensor cells of a pixelated capacitive sensor into at least one class based on capacitance values for sensor cells indicated by corresponding capacitance signals and assigning an attribute to sensor cells based on the classification of the corresponding capacitance signals.

In a second embodiment, the method further involves measuring at least one physical parameter of the pixelated capacitive sensor based on the capacitance values of the classified capacitance signals.

In another embodiment, the method further involves measuring at least one physical property of the environment related to the pixelated capacitive sensor based on subsequent capacitance signals from sensor cells of the pixelated capacitive sensor that have been assigned a common attribute that corresponds to the physical property.

In another embodiment, multiple physical properties of the environment of the pixelated capacitive sensor can be simultaneously measured by the pixelated capacitive sensor.

In another embodiment, the physical property measurement is further based on subsequent capacitance signals from a reference class.

In another embodiment, the physical property is measured by averaging the subsequent capacitance signals.

In another embodiment, averaging the subsequent capacitance signals involves weighting subsequent capacitance signals with more noise less than subsequent capacitance signals with less noise.

In another embodiment, the method further involves exposing the pixelated capacitive sensor to a gas mixture and exporting the subsequent capacitance signals from sensor cells assigned a common attribute corresponding to gas to a data fusion algorithm to determine a concentration of gases in the gas mixture.

In another embodiment, the method further involves exposing the pixelated capacitive sensor to motion and continuously exporting the subsequent capacitance signals from sensor cells assigned a common attribute corresponding to motion to a data fusion algorithm that combines the measurements to detect motion.

In another embodiment, the method further involves exposing the pixelated capacitive sensor to at least one of pressure and sound and continuously exporting the subsequent capacitance signals from sensor cells assigned a common attribute corresponding to at least one of pressure and sound, respectively, to a data fusion algorithm that combines the measurements to detect pressure.

In another embodiment, a pixelated capacitive sensor system including an array of sensor cells, memory, and a microcontroller is disclosed. In the embodiment, the memory includes program instructions wherein execution of the program instructions by the microcontroller causes the microcontroller to perform steps involving classifying capacitance signals from sensor cells of a pixelated capacitive sensor into at least one class based on capacitance of the sensor cells and assigning an attribute to sensor cells based on the classification of corresponding capacitance signals.

In another embodiment, the steps further include measuring at least one physical parameter of the pixelated capacitive sensor based on the capacitance values of the classified capacitance signals.

In another embodiment, the steps further comprise measuring at least one physical property of the environment related to the pixelated capacitive sensor based on subsequent capacitance signals from sensor cells of the pixelated capacitive sensor that have been assigned a common attribute that corresponds to the physical property.

In another embodiment, multiple physical properties of the environment of the pixelated capacitive sensor can be simultaneously measured by the pixelated capacitive sensor.

In another embodiment, the physical property measurement is further based on subsequent capacitance signals from a reference class.

In another embodiment, the physical property is measured by averaging the subsequent capacitance signals.

In another embodiment, averaging the subsequent capacitance signals involves weighting subsequent capacitance signals with more noise less than subsequent capacitance signals with less noise.

In another embodiment, the steps further involve exposing the pixelated capacitive sensor to a gas mixture and exporting the subsequent capacitance signals from sensor cells assigned a common attribute corresponding to gas to a data fusion algorithm to determine a concentration of gases in the gas mixture.

In another embodiment, the steps further involve exposing the pixelated capacitive sensor to motion and continuously exporting the subsequent capacitance signals from sensor cells assigned a common attribute corresponding to motion to a data fusion algorithm that combines the measurements to detect motion.

In another embodiment, the steps further involve exposing the pixelated capacitive sensor to pressure and continuously exporting the subsequent capacitance signals from sensor cells assigned a common attribute corresponding to pressure to a data fusion algorithm that combines the measurements to detect pressure.

Other aspects and advantages of embodiments of the present invention will become apparent from the following detailed description, taken in conjunction with the accompanying drawings, illustrated by way of examples of the principles of the invention.

BRIEF DESCRIPTION OF THE DRAWINGS

FIG. 3 shows a generic layout for a pixelated capacitive sensor with multiple copies of differently functionalized regions.

FIGS. 5A and 5B illustrate the assignment of attributes to sensor cells in accordance with an embodiment of the invention

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
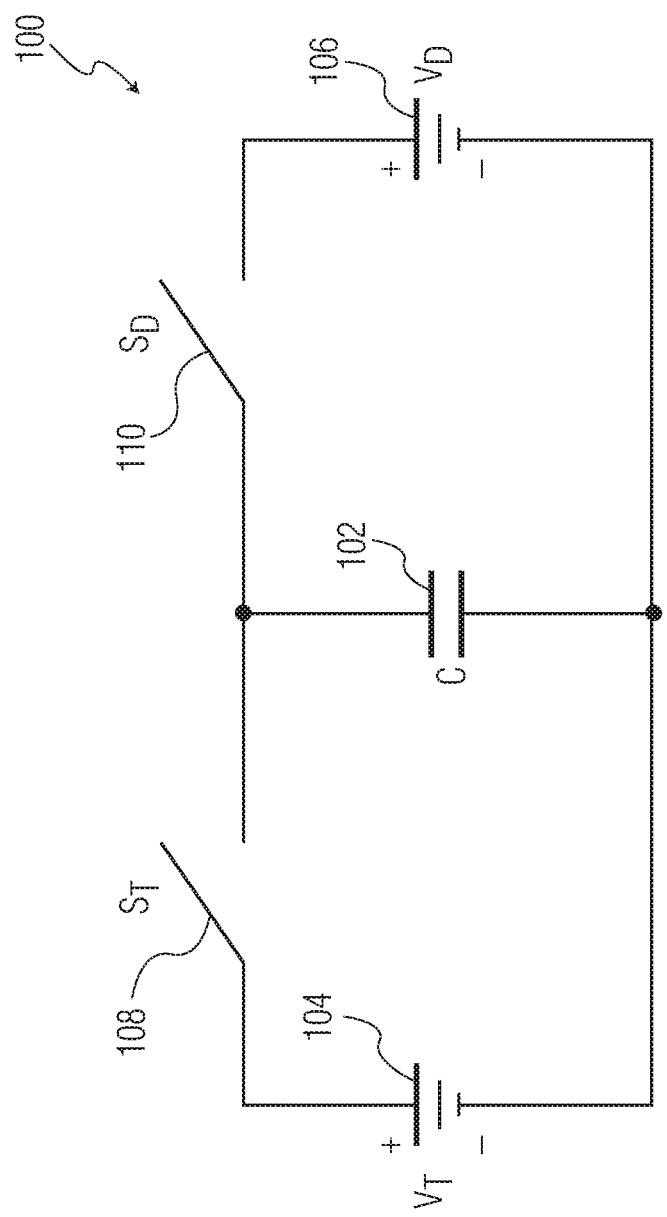
FIG. 1 depicts an example of a sensor cell that can be used in a pixelated capacitive sensor.

FIG. 1 depicts an example of a sensor cell 100 that can be used in a pixelated capacitive sensor. The sensor cell includes a sense capacitor 102, a voltage input ($V_T$) 104, a voltage output ($V_D$) 106, an input switch ($S_T$) 108, and an output switch ($S_D$) 110. The sense capacitor has a capacitance of C. In operation, the sense capacitor is charged from the voltage input and discharged to the voltage output by cyclically closing and opening the input switch and output switch in an alternating pattern. When the capacitance of the sense capacitor and the net charge transferred from the voltage input to the voltage output changes between cycles (e.g., due to a foreign object disturbing the electric field lines between the capacitor plates of the sense capacitor or if a dielectric property of a dielectric material used in the sense capacitor changes), the change can be used to trigger a signal impulse.

Figure 2A:
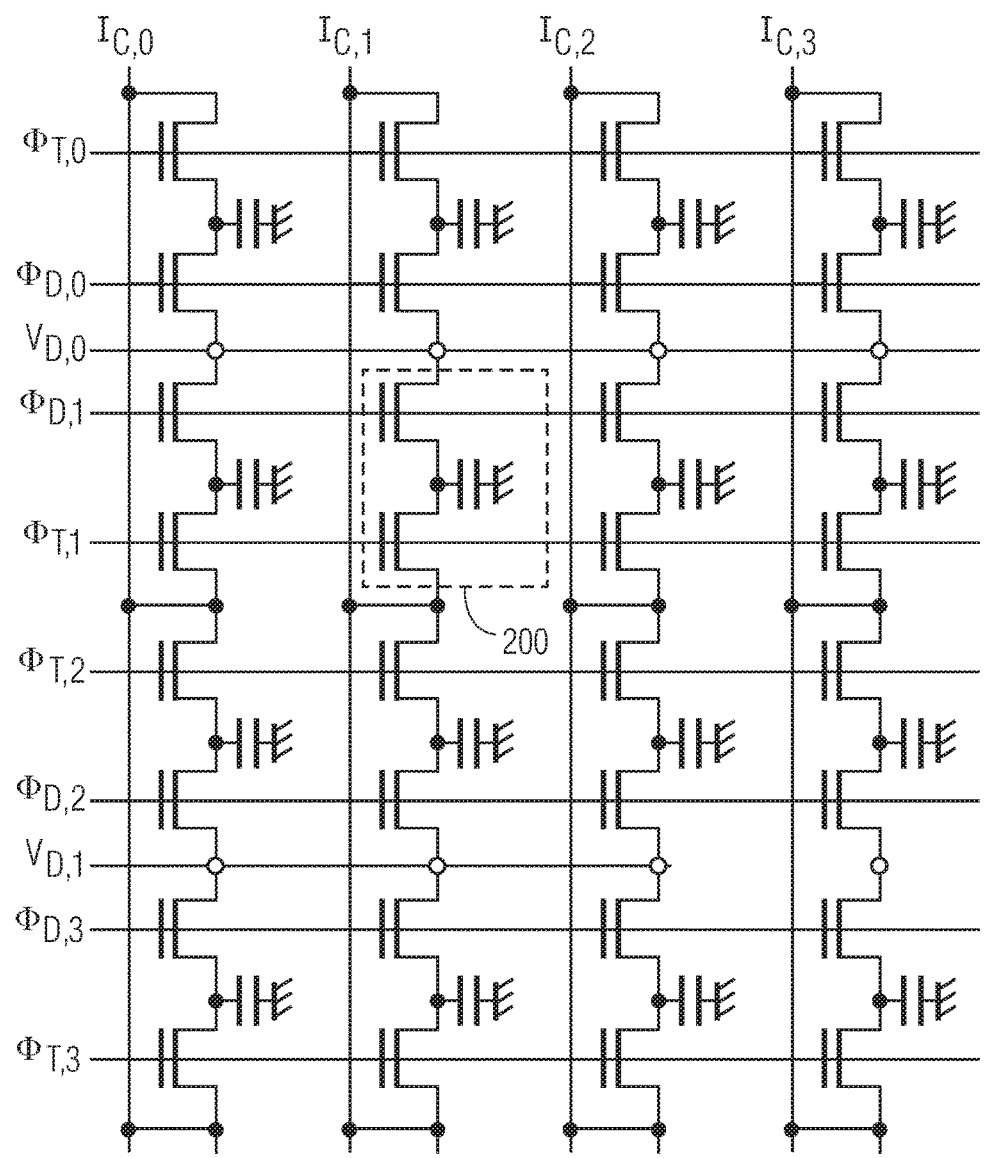
FIG. 2A is an exemplary schematic of a pixelated capacitive sensor.
Figure 2B:
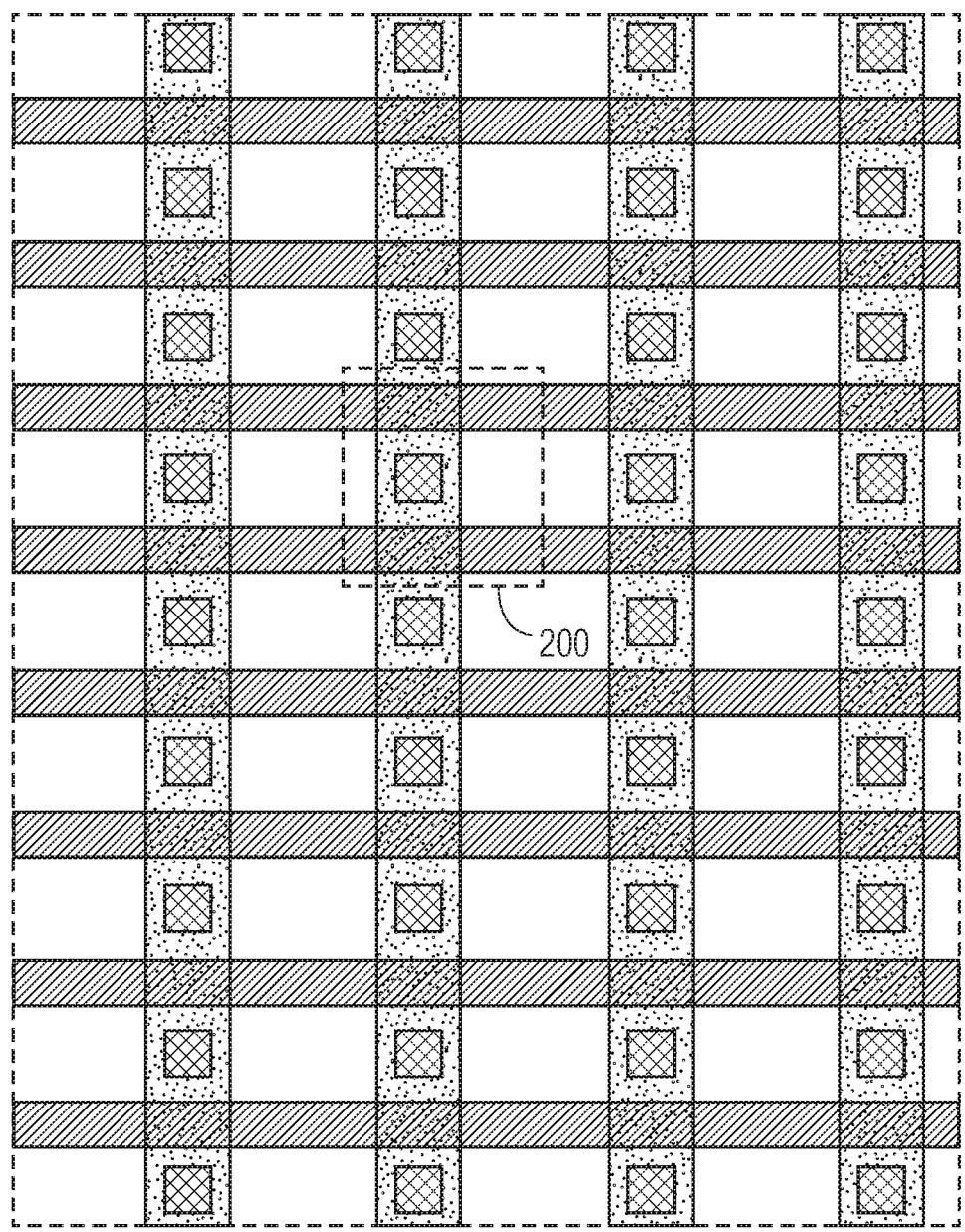
FIG. 2B is an exemplary layout of the pixelated capacitive sensor of FIG. 2A.

FIG. 2A is an exemplary schematic of a pixelated capacitive sensor and FIG. 2B is an exemplary layout of the pixelated capacitive sensor of FIG. 2A. As shown in the schematic of FIG. 2A, the pixelated capacitive sensor is made up of an array of sensor cells (such as sensor cell 200 indicated by the dotted box) arranged in orthogonal rows. As shown in FIG. 2B, a dense layout can be selected to implement the schematic of FIG. 2A. Accordingly, the pixelated capacitive sensor contains an array of sensor cells 200 that are individually addressable. In an embodiment, the pixelated capacitive sensor can be a CMOS-based sensor using a CMOS-compatible design in which the sense electrodes can be exposed at the surface of the sensor chip and optionally covered by a thin dielectric protection layer.

The pixelated capacitive sensor can be functionalized to become sensitive to particular sense targets (e.g., conditions to be detected). In an embodiment, the sensor can be functionalized by depositing sensing material over sensor cells of the pixelated capacitive sensor. FIG. 3 shows a generic layout for a pixelated capacitive sensor 350 with multiple copies of differently functionalized regions 308-1, 308-2, 308-3, 308-4. Different sensing materials can be deposited directly on different regions of the pixelated capacitive sensor in order to functionalize the pixelated capacitive sensor to simultaneously sense multiple different sense targets, while some regions of the pixelated capacitive sensor serve as reference sensor cells 300 and remain uncovered and not functionalized. Additionally, the different sensing materials can be deposited on multiple regions of the pixelated capacitive sensor. Ideally, dielectric properties (e.g., resistivity, dielectric permittivity, relaxation times, layer thickness, etc.) of a particular functionalized region of the pixelated capacitive sensor change when the pixelated capacitive sensor is exposed to a sense target for the particular functionalized region compared to other regions or reference sensor cells of the pixelated capacitive sensor.

In operation, limitations on fabricating a pixelated capacitive sensor (e.g., due to limitations of sensing chemistry and/or physics) make it hard or even impossible to functionalize an exact region (e.g., as illustrated in FIG. 3) of the pixelated capacitive sensor. These limitations often lead to accidental or unintentional sensitivity of regions (e.g., a region of the pixelated capacitive sensor outside of an area intended to be functionalized to be sensitive to $CO_2$ gas may become sensitive to $CO_2$ as well.). Accidental or unintentional sensitivity can be addressed by creating masks for different functionalization material to be applied to a pixelated capacitive sensor or by cross-checking signals from similarly functionalized regions against other regions. However, these approaches may not be ideal. For example, the process of creating and using separate masks for different functionalization materials can be a bottleneck in the fabrication process and approaches for cross-checking signals (e.g., averaging signals received from similarly functionalized regions) can be flawed due to inaccuracies and defects of the pixelated capacitive sensor due to erroneous sensor cells.

In accordance with an embodiment of the invention, a method for analyzing signals from a pixelated capacitive sensor is disclosed. The method involves classifying capacitance signals from sensor cells of a pixelated capacitive sensor into at least one class based on capacitance values for sensor cells indicated by corresponding capacitance signals and assigning an attribute to sensor cells based on the classification of the corresponding capacitance signals. In an embodiment, a capacitance signal is an analog or digital output of a sensor cell (e.g., an output from an analog timer circuit and/or the voltage across a capacitor) and a capacitance value is a digital representation of the capacitance of the sensor cell determined from the capacitance signal (e.g., a multi-bit value output from an analog-to-digital converter as a function of the capacitance signal). Subsequently, physical parameters of the pixelated capacitive sensor can be measured based on the capacitance values of the classified capacitance signals. Physical parameters of the pixelated capacitive sensor may include, for example, the thickness of sensing material applied to the pixelated capacitive sensor, areas covered and not covered by the sensing material, electrode disturbs, or inclusions in the sensing material. Furthermore, physical properties of the environment related to the pixelated capacitive sensor (e.g., temperature, air, or audio conditions) can be measured based on subsequent capacitance signals from sensor cells of the pixelated capacitive sensor that have been assigned a common attribute that corresponds to the physical property. Physical properties of the environment of the pixelated capacitive sensor may include, for example, humidity, gas exposure, pressure, motion, and sound.

Thus, each individual pixelated capacitive sensor can determine which sensor cells have been functionalized, with what sensing material, and with how much of the sensing material after the pixelated capacitive sensor has been functionalized. Additionally, each individual pixelated capacitive sensor can also determine, based on the capacitance signals, which sensor cells have been functionalized to detect a particular physical property. For example, if it is determined that a group of sensor cells has been functionalized to sense a type of gas, then the presence of the gas can be measured based on the subsequent capacitance signals from that group of sensor cells.

Because physical properties can be measured for each pixelated capacitive sensor based on the particular functionalization for that pixelated capacitive sensor, the need to accurately apply sensing material and to cross-check for accidental or unintentional sensitivity may be reduced. Additionally, since sensor cells on the pixelated capacitive sensor can be functionalized differently, multiple physical property measurements can be taken simultaneously by a single pixelated capacitive sensor.

Analyzing Signals by Classifying Capacitance Signals and Assigning Attributes to Corresponding Sensor Cells Traditionally, analyzing signals from a pixelated capacitive sensor can be implemented using calibration and reading electronics on the pixelated capacitive sensor. This technique may require additional electronics, such as calibration cells, to be incorporated into the pixelated capacitive sensor. The additional electronics may increase the size and complexity of the pixelated capacitive sensor or may limit the flexibility of the pixelated capacitive sensor.

Figure 4:
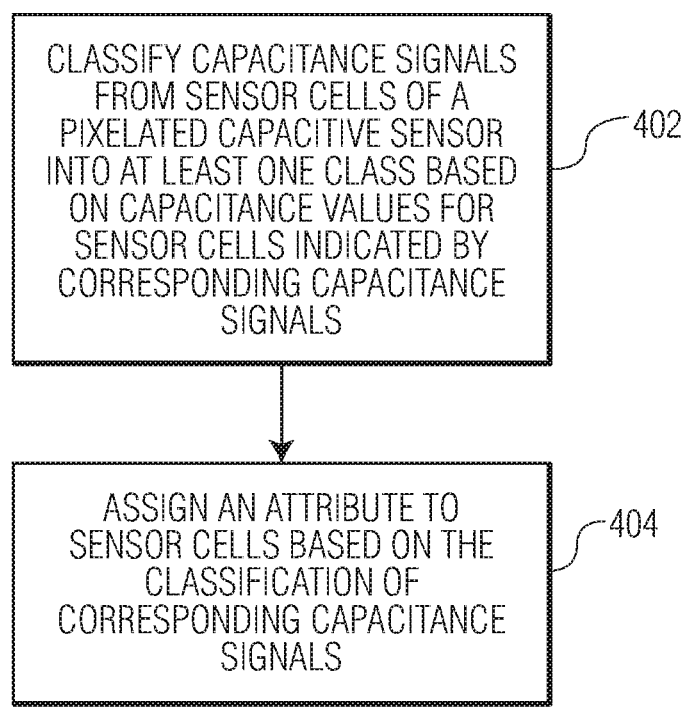
FIG. 4 is a flow chart diagram of a method for analyzing signals from a pixelated capacitive sensor in accordance with an embodiment of the invention.

Alternatively, in accordance with an embodiment of the invention, analysis can be performed by classifying capacitance signals and assigning attributes to corresponding sensor cells based on the classification by the pixelated capacitive sensor based on capacitance signals from sensor cells of the pixelated capacitive sensor. FIG. 4 is a flow chart diagram of a method for analyzing signals from a pixelated capacitive sensor in accordance with an embodiment of the invention. At block 402, capacitance signals from sensor cells of a pixelated capacitive sensor are classified into at least one class based on capacitance values for sensor cells indicated by corresponding capacitance signals. The creation of classes into which capacitance values are classified is described below. At block 404, an attribute can be assigned to the sensor cells based on the classification of corresponding capacitance signals. For example, a sensor cell corresponding to a capacitance signal classified as covered by a $CO_2$ sensing material may be assigned the attribute "$CO_2$ Sensor Cell." Alternatively, a sensor cell corresponding to a capacitance signal classified as an outlier may be assigned the attribute "dead sensor cell." Accordingly, which sensor cells are sensitive to which sense targets or should be excluded, can be determined after functionalization for each particular pixelated capacitive sensor. Because the determination is made for each pixelated capacitive sensor based on the actual physical parameters of the pixelated capacitive sensor, the accuracy of measurements can be higher than from traditional pixelated capacitive sensors and traditional non-pixelated capacitive sensors.

Creation of Classes

As described above at block 402 of FIG. 4, capacitance signals from sensor cells of a pixelated capacitive sensor are classified into at least one class based on capacitance values for sensor cells indicated by corresponding capacitance signals. In an embodiment, the at least one class can be determined manually before the capacitance signals are generated or determined based on the generated capacitance signals. Classes determined based on capacitance signals can be defined based on capacitance. For example, signals with low capacitance can be categorized as having low capacitance. Alternatively, signals with high capacitance can be categorized as having high capacitance. In other embodiments, classes can be determined as ranges (e.g., between a lower boundary and an upper boundary) based on capacitance values of generated capacitance signals. For example, a class can be defined for each standard deviation away from the average capacitance value or a class can be defined other various quantiles. Additionally, a class can be defined based on other splits of the capacitance values (e.g., a class defined for capacitance signals with a capacitance value in the top 10%). Thus, classes can be defined manually or based on the spread of the actual capacitance signals generated.

Assignment of Attributes

Figure 5A:
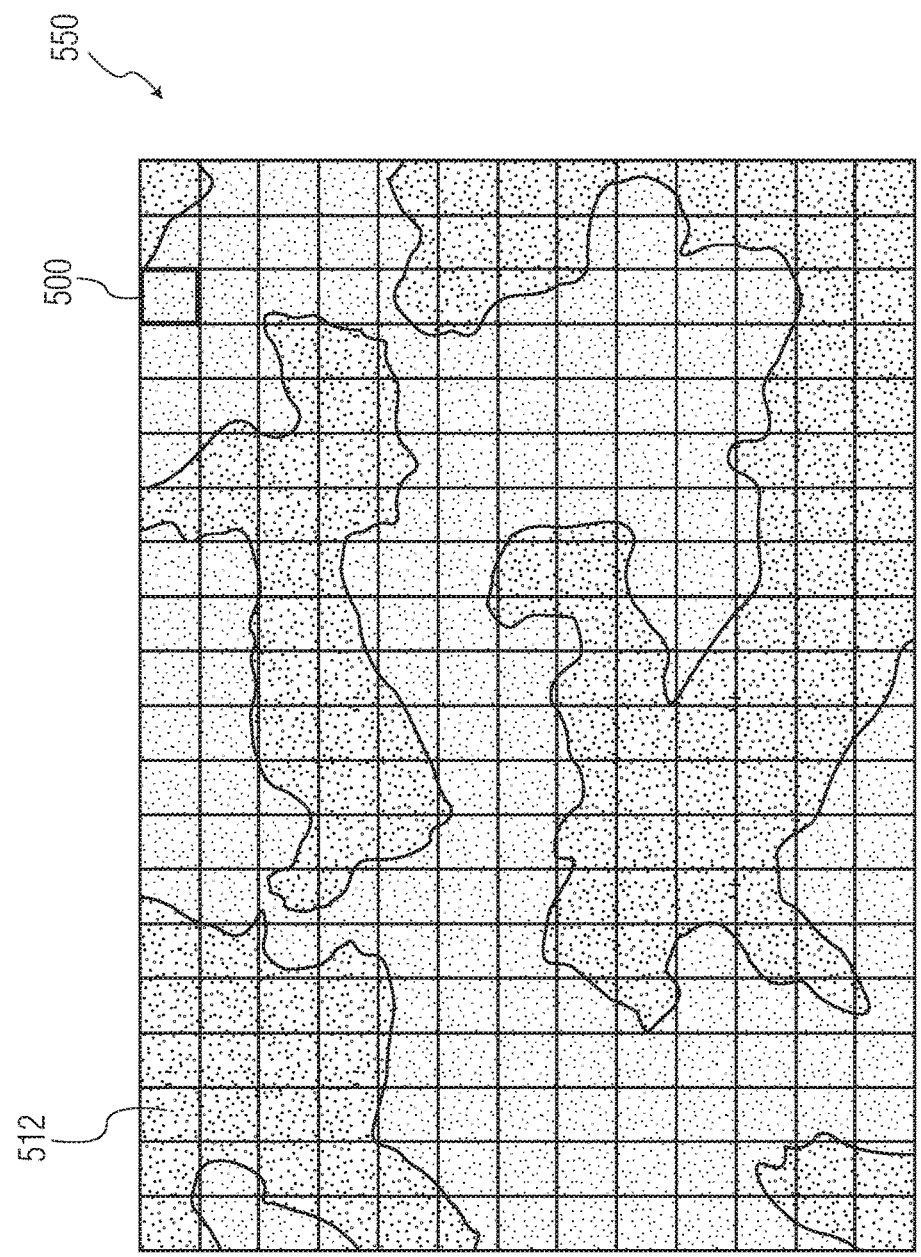

As discussed above at block 404 of FIG. 4, attributes can be assigned to the sensor cells based on the classification of corresponding capacitance signals. FIGS. 5A and 5B illustrate the assignment of attributes to sensor cells in accordance with an embodiment of the invention. FIG. 5A is a portion of a pixelated capacitive sensor 550 on which a sensing material 512 has been applied to sensor cells (such as sensor cell 500) of the pixelated capacitive sensor. In an embodiment, examples of the sensing material can include mobile masses (e.g., for detecting motion), hermetically sealed membranes (e.g., for detecting pressure), and semipermeable substrates (e.g., for detecting gases). In the illustration of FIGS. 5A and 5B, the dark regions represent the sensing material, while the light regions represent bare sensor cells.

In accordance with an embodiment of the invention, capacitance signals are classified and sensor cells can be assigned attributes based on the classification of corresponding capacitance signals. For example, capacitance signals from sensor cells covered by the sensing material may have an increased capacitance value. Thus, sensor cells corresponding to capacitance signals with capacitance values above an upper bound value can be assigned a "covered" attribute, sensor cells corresponding to capacitance signals with capacitance values below a lower bound value (e.g., due to a faulty sensor cell or other interference) can be assigned an "ignore" attribute, and sensor cells corresponding to capacitance signals in between the upper bound value and the lower bound value can be assigned a "reference" attribute. In an embodiment, capacitance signals from sensor cells assigned a reference attribute remain unchanged when exposed to any sense target and can be used for making comparison-based analysis with other classes. In FIG. 5B, based on the classification of corresponding capacitance signals, sensor cells can be assigned the attributes "covered" 500-2, "reference" 500-1, or "ignore" 500-0.

Signal Averaging

In an embodiment, the measurement of a physical property can be determined by averaging the capacitance of all the sensor cells assigned an attribute related to the physical parameter or property. For example, for a set of sensor cells assigned an attribute, where the actual capacitance $y_k$ received from sensor cell k can be written as:

$$y_k = x_k + n_k$$

where $x_k$ is the expectation value of the capacitance of sensor cell k, and $n_k$ is the deviation of $y_k$ from $x_k$ caused by noise. An average z can then be calculated as:

$$z = w_1 y_1 + w_2 y_2 + \ldots + w_K y_K$$

where $w_k$ is the weight applied to measurements $y_1 \ldots y_K$ and K corresponds to an index in the set of total sense electrodes. A naïve average can be calculated by setting $w_k$ equal to $$\frac{1}{K}.$$

The naïve average has standard deviation $\sigma_A/\sqrt{K}$, where $\sigma_A^2$ is the arithmetic average of the variances $\sigma_k^2$ of the noises $n_k$ in the measured signals $y_k$ and can be written:

$$\sigma_A^2 = \frac{1}{K}(\sigma_1^2 + \sigma_2^2 + \ldots + \sigma_K^2)$$

The naïve average gives signal measurements $y_k$ the same weight when averaged to calculate the single measurement of the physical parameter or property.

Alternatively, in accordance with an embodiment of the invention, the subsequent capacitance signals can be weighted by a set of weight factors given by:

$$w_k = \frac{1}{K} \frac{\sigma_H^2}{\sigma_k^2}$$

where $\sigma_H^2$ is the harmonic average of the variances $\sigma_k^2$ of the noises $n_k$ and given by:

$$\sigma_H^2 = \left(\frac{1}{K}\left(\frac{1}{\sigma_1^2} + \frac{1}{\sigma_2^2} + \ldots + \frac{1}{\sigma_K^2}\right)\right)^{-1}$$

The standard deviations $\sigma_k$, required to calculate the weight factors, can be estimated from capacitance measurements under reference conditions (e.g., during a sensor calibration phase). The harmonic average of a set of positive numbers that are not all equal is less than the arithmetic average of the same set of numbers. Accordingly, weighting the average can result in an average that has a lower standard deviation $\sigma_H/\sqrt{K}$ than the naïve average. Thus, signals with more noise can be weighted lower than signals with less noise such that when the weighted signals are averaged, the result is a single weighted measurement with reduced noise variance. Weighted averaging can be applied to groups of signals measured with a pixelated sensor, but cannot be applied to signals measured with sensors that only have a single sensor cell per deposited sense material.

Measurement of Challenging Variables

By classifying capacitance signals and assigning sensor signals attributes based on the classification of corresponding capacitance signals, pixelated capacitive sensors can be functionalized to measure more challenging variables. For example, the pixelated capacitive sensor can sense bad or impeded pixels of the pixelated capacitive sensor and can be functionalized to sense the density of gas in a gas mixture, to sense motion, to sense pressure, or to sense sound. Additionally, object detection algorithms can be applied to the classified capacitance signals and, in further consideration of design parameters (e.g., parameters that indicate which sensing materials are deposited), an actual shape and location of deposited sensing material can be determined.

Classifying capacitance signals and assigning sensor signals attributes based on the classification of corresponding capacitance signals requires high spatial resolution and, therefore, a dense array of small sensor cells with small electrodes. However, small electrodes typically have high statistical spread in their dimensions (electrode-to-electrode variations within the same electrode array). Because an electrode's sense capacitance scales with its dimensions, this leads to fixed-pattern noise in images (bitmaps of electrode capacitances) taken with a pixelated capacitive sensor. Additionally, unwanted inclusions can form in the deposited sensing material. Thus, detecting physical parameters, such as fixed-pattern noise and inclusions, of a pixelated capacitive sensor can be used to inform classifications of capacitance signals and provide a more accurate reading. For example, sensor cells covered by an inclusion in the deposited sensing material may be classified as "ignore" rather than "covered."

Physical Parameters

Figure 6:
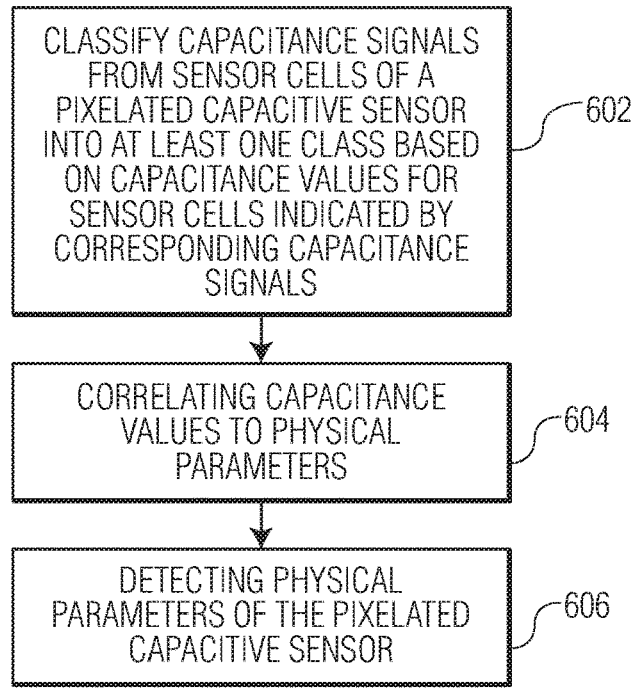
FIG. 6 is a flow chart diagram of a technique for detecting physical parameters of a pixelated capacitive sensor.

Subsequent to classifying capacitance signals and assigning attributes to sensor cells, physical parameters of the pixelated capacitive sensor can be measured. FIG. 6 is a flow chart diagram of a technique for detecting physical parameters of a pixelated capacitive sensor. At block 602 capacitance signals from sensor cells of a pixelated capacitive sensor are classified into at least one class based on capacitance values for sensor cells indicated by corresponding capacitance signals. The classification can be similar to the classification described above at block 402 with reference to FIG. 4. At block 604 in FIG. 6, capacitance values are correlated to the occurrence of physical parameters. For example, a capacitance value of zero may be correlated to a dead sensor cell, while a single low capacitance value from a sensor cell surrounded by sensor cells from which higher capacitance values are measured may be correlated to an inclusion between the sensor cell and the sensing material. Additionally, if it is known that a sensing material has been applied, covered sensor cells can be identified as covered by the sensing material. At block 606, physical parameters of the pixelated capacitive sensor can be detected based on the classification of capacitance signals from sensor cells. Thus, when subsequent capacitance signals are generated from the pixelated capacitive sensor, the detected physical parameters can be taken into account (e.g., capacitance signals from a dead sensor cell can be ignored).

Physical Properties

In addition to physical parameters, once capacitance signals have been classified and sensor cells have been assigned attributes, physical properties of the environment related to the pixelated capacitive sensor can be measured based on subsequent capacitance signals. For example, capacitance signals from sensor cells assigned attributes corresponding to physical properties (e.g., a gas, pressure, motion, or sound) can be measured to determine the presence of the physical property (e.g., is a gas present) or the magnitude of the property (e.g., what quantity of the gas is present).

Figure 7:
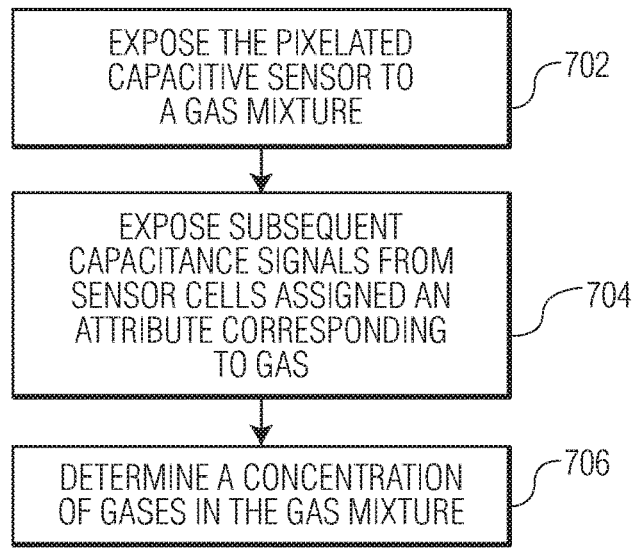
FIG. 7 is a flow chart diagram of a technique for sensing a concentration of gases under investigation.

FIG. 7 is a flow chart diagram of a technique for sensing a concentration of gases under investigation. At block 702, the pixelated capacitive sensor is exposed to a gas mixture. At block 704, subsequent capacitance signals from sensor cells assigned an attribute corresponding to gas are exported. In an embodiment, the subsequent capacitance signals are exported for processing on the pixelated capacitive sensor. In another embodiment, the subsequent capacitance signals are exported for processing off of the pixelated capacitive sensor. At block 706, the concentration of gases in the gas mixture is determined from the exported subsequent capacitance signals. In an embodiment, the determination is made by applying a data fusion algorithm to the subsequent capacitance signals.

Figure 8:
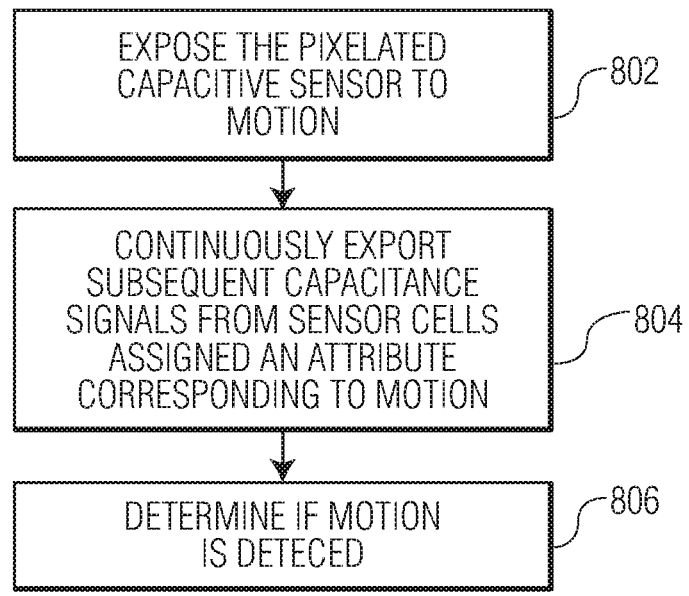
FIG. 8 is a flow chart diagram of a technique for sensing motion.

FIG. 8 is a flow chart diagram of a technique for sensing motion. In an embodiment, the pixelated capacitive sensor is functionalized by attaching mobile masses above the sensor cells of the pixelated capacitive sensor. In an embodiment, the mobile masses can be suspended membranes or masses that can move under the influence of linear or rotational acceleration. At block 802, the pixelated capacitive sensor is exposed to motion. At block 804, subsequent capacitance signals from sensor cells assigned an attribute corresponding to motion are continuously exported. In an embodiment, the subsequent capacitance signals are exported for processing on the pixelated capacitive sensor. In another embodiment, the subsequent capacitance signals are exported for processing off of the pixelated capacitive sensor. At block 806, motion (or lack thereof) is detected from the exported subsequent capacitance signals. In an embodiment, the magnitude of the motion can also be detected. In another embodiment, the determination is made by applying a data fusion algorithm to the subsequent capacitance signals.

Figure 9:
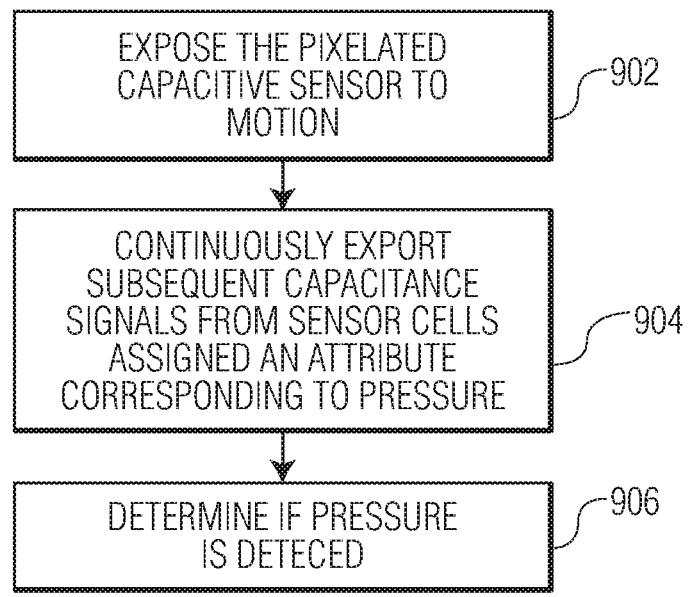
FIG. 9 is a flow chart diagram of a technique for sensing pressure.

FIG. 9 is a flow chart diagram of a technique for sensing pressure. In an embodiment, the pixelated capacitive sensor is functionalized by attaching suspended membranes above the sensor cells of the pixelated capacitive sensor. In an embodiment, the side of the membrane that faces the sensor cell should be hermetically sealed from air on the opposite side. Alternatively, the sensor cells can be functionalized with non-moving parts, such as sensing material responsive to variations in air pressure, humidity, nitrogen or oxygen. At block 902, the pixelated capacitive sensor is exposed to pressure. At block 904, subsequent capacitance signals from sensor cells assigned an attribute corresponding to pressure are continuously exported. In an embodiment, the subsequent capacitance signals are exported for processing on the pixelated capacitive sensor. In another embodiment, the subsequent capacitance signals are exported for processing off of the pixelated capacitive sensor. At block 906, pressure (or lack thereof) is detected from the exported subsequent capacitance signals. In an embodiment, the magnitude of the pressure can also be detected. In another embodiment, the determination is made by applying a data fusion algorithm to the subsequent capacitance signals. In an embodiment, air pressure can also be measured from the exported subsequent capacitance signals by comparing the difference between the two sides of the suspended membrane.

Figure 10:
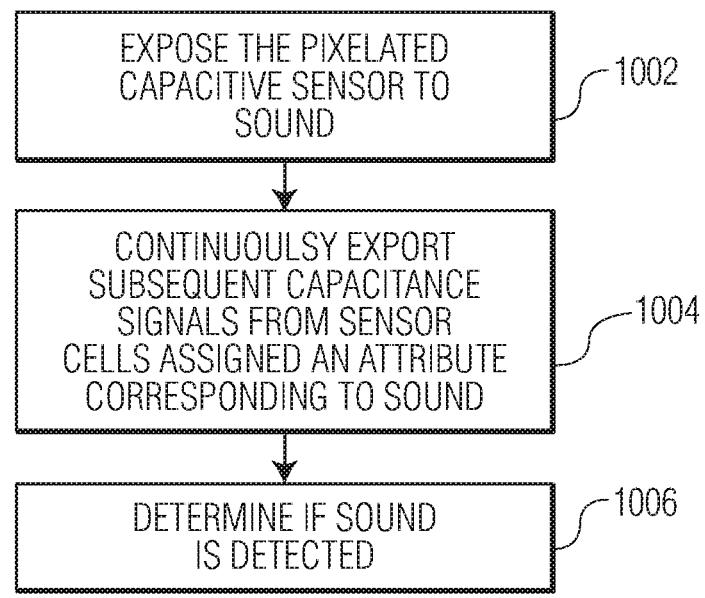
FIG. 10 is a flow chart diagram of a technique for sensing sound.

FIG. 10 is a flow chart diagram of a technique for sensing sound. In an embodiment, sound can be sensed using sensor cells functionalized to sense pressure, as described with reference to FIG. 9 above. At block 1002, the pixelated capacitive sensor is exposed to sound. At block 1004, subsequent capacitance signals from sensor cells assigned an attribute corresponding to sound are continuously exported. In an embodiment, the subsequent capacitance signals are exported for processing on the pixelated capacitive sensor. In another embodiment, the subsequent capacitance signals are exported for processing off of the pixelated capacitive sensor. At block 1006, sound (or lack thereof) is detected from the exported subsequent capacitance signals. In an embodiment, the magnitude of the sound can also be detected. In another embodiment, the determination is made by applying a data fusion algorithm to the subsequent capacitance signals.

In an embodiment, the data fusion algorithm compares capacitance signals before and after functionalization or exposure to determine if a change in capacitance has occurred. In an embodiment, capacitive signals from before may be retrieved from memory within the pixelated capacitive sensor or downloaded from memory outside of the pixelated capacitive sensor.

Figure 11:
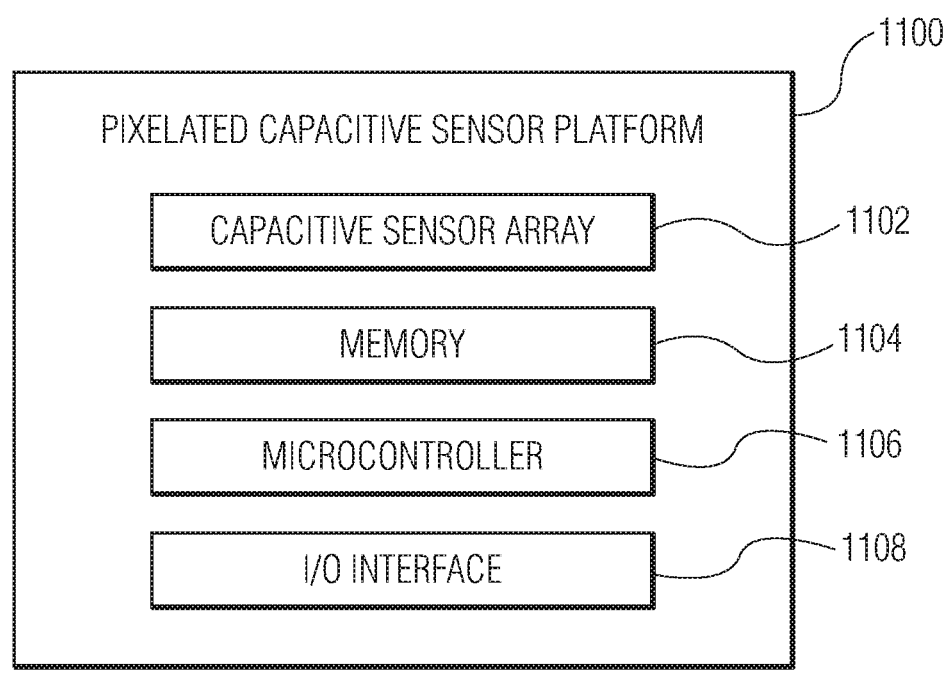
FIG. 11 is a block diagram of a pixelated capacitive sensor platform.

FIG. 11 is a block diagram of a pixelated capacitive sensor platform 1100. In an embodiment, the platform is realized on a chip, such as a chip fabricated using a CMOS process. The pixelated capacitive sensor platform includes an array of sensor cells 1102, memory 1104, a microcontroller 1106, and an input/output (I/O) interface 1108. The memory can include ROM, Flash, RAM or other persistent state memory and contains program instructions for execution by the microcontroller. The microcontroller can be an 8-bit or a 32-bit CPU and may be extended with signal processing accelerator hardware. The I/O interface can be implemented as a serial data output via pins of the chip of the pixelated capacitive sensor platform. The steps described above are performed when the microcontroller executes the program instructions stored in memory. In another embodiment, part or all of the steps above may be performed on a separate chip. Although not shown, the platform can further include radios for wireless communication and secure elements for identification and authentication purposes in other embodiments.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for analyzing signals from a pixelated capacitive sensor, the method comprising:

classifying capacitance signals from sensor cells of a pixelated capacitive sensor into at least one class based on capacitance values for sensor cells indicated by corresponding capacitance signals;

assigning an attribute to sensor cells based on the classification of the corresponding capacitance signals; and measuring at least one physical property of the environment related to the pixelated capacitive sensor based on subsequent capacitance signals from sensor cells of the pixelated capacitive sensor that have been assigned a common attribute that corresponds to the physical property;

the method further comprising at least one of:

a) exposing the pixelated capacitive sensor to a gas mixture and exporting the subsequent capacitance signals from sensor cells assigned a common attribute corresponding to gas to a data fusion algorithm to determine a concentration of gases in the gas mixture;

b) exposing the pixelated capacitive sensor to motion and continuously exporting the subsequent capacitance signals from sensor cells assigned a common attribute corresponding to motion to a data fusion algorithm that combines the measurements to detect motion; and c) exposing the pixelated capacitive sensor to at least one of pressure and sound and continuously exporting the subsequent capacitance signals from sensor cells assigned a common attribute corresponding to at least one of pressure and sound, respectively, to a data fusion algorithm that combines the measurements to detect pressure.

2. The method of claim 1 further comprising measuring at least one physical parameter of the pixelated capacitive sensor based on the capacitance values of the classified capacitance signals.

3. The method of claim 1, wherein multiple physical properties of the environment of the pixelated capacitive sensor can be simultaneously measured by the pixelated capacitive sensor.

4. The method of claim 1, wherein the physical property measurement is further based on subsequent capacitance signals from a reference class.

5. The method of claim 1, wherein the physical property is measured by averaging the subsequent capacitance signals.

6. The method of claim 5, wherein averaging the subsequent capacitance signals involves weighting subsequent capacitance signals with more noise less than subsequent capacitance signals with less noise.

7. A pixelated capacitive sensor system including an array of sensor cells, memory, and a microcontroller, the memory containing program instructions wherein execution of the program instructions by the microcontroller causes the microcontroller to perform steps comprising:

classifying capacitance signals from sensor cells of a pixelated capacitive sensor into at least one class based on capacitance of the sensor cells;

assigning an attribute to sensor cells based on the classification of corresponding capacitance signals; and measuring at least one physical property of the environment related to the pixelated capacitive sensor based on subsequent capacitance signals from sensor cells of the pixelated capacitive sensor that have been assigned a common attribute that corresponds to the physical property; and further comprising at least one of:

a) exposing the pixelated capacitive sensor to a gas mixture and exporting the subsequent capacitance signals from sensor cells assigned a common attribute corresponding to gas to a data fusion algorithm to determine a concentration of gases in the gas mixture;
b) exposing the pixelated capacitive sensor to motion and continuously exporting the subsequent capacitance signals from sensor cells assigned a common attribute corresponding to motion to a data fusion algorithm that combines the measurements to detect motion; and
c) exposing the pixelated capacitive sensor to pressure and continuously exporting the subsequent capacitance signals from sensor cells assigned a common attribute corresponding to pressure to a data fusion algorithm that combines the measurements to detect pressure.

8. The pixelated capacitive sensor system of claim 7, wherein the steps further comprise measuring at least one physical parameter of the pixelated capacitive sensor based on the capacitance values of the classified capacitance signals.

9. The pixelated capacitive sensor system of claim 7, wherein multiple physical properties of the environment of the pixelated capacitive sensor can be simultaneously measured by the pixelated capacitive sensor.

10. The pixelated capacitive sensor system of claim 7, wherein the physical property measurement is further based on subsequent capacitance signals from a reference class.

11. The pixelated capacitive sensor system of claim 7, wherein the physical property is measured by averaging the subsequent capacitance signals.

12. The pixelated capacitive sensor system of claim 11, wherein averaging the subsequent capacitance signals involves weighting subsequent capacitance signals with more noise less than subsequent capacitance signals with less noise.

* * * * *